United States Patent
Altunbasak et al.

(10) Patent No.: US 6,389,168 B2
(45) Date of Patent: *May 14, 2002

(54) OBJECT-BASED PARSING AND INDEXING OF COMPRESSED VIDEO STREAMS

(75) Inventors: Yucel Altunbasak; HongJiang Zhang, both of Mountain View, CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,399

(22) Filed: Oct. 13, 1998

(51) Int. Cl.[7] .............................. G06K 9/62; G06K 9/36; H04N 5/14; G09G 5/00

(52) U.S. Cl. ...................... 382/224; 382/232; 348/700; 345/723

(58) Field of Search .................. 382/232, 236, 382/224; 348/231, 222, 722, 7, 416, 700; 345/328, 440, 723; 707/104; 375/240.08

(56) References Cited

U.S. PATENT DOCUMENTS

| | | | |
|---|---|---|---|
| 5,635,982 A | * 6/1997 | Zhang et al. | ................ 348/231 |
| 5,708,767 A | 1/1998 | Yeo et al. | ..................... 395/140 |
| 5,719,643 A | 2/1998 | Nakjima | ....................... 348/700 |
| 5,767,893 A | * 6/1998 | Chen et al. | ....................... 348/7 |
| 5,767,923 A | 6/1998 | Coleman, Jr. | ................. 348/700 |
| 5,963,670 A | * 10/1999 | Lipson et al. | ................. 382/224 |

OTHER PUBLICATIONS

"Video Object Model and Segmentation for Content–Based Video Indexing," Zhong, D. et al., 1997 IEEE International Symposium on Circuits and Systems, Jun. 9–12, 1997, Hong Kong, pp. 1492–1495.*

"Coding of Subregions for Content–Based Scalable Video," T. Chen et al., IEEE Transactions on Circuits and Systems for Video Technology, vol. 7, No. 1, Feb. 1977, pp. 256–260.*

(List continued on next page.)

*Primary Examiner*—Wenpeng Chen

(57) ABSTRACT

A method and system for object-based video retrieval and indexing include a configuration detection processor for deriving quantitative attribute information for video frames in a compressed video stream. The quantitative attribute information includes object data for a video frame, including the number of objects and their orientation within the video frame and the size, shape, texture, and motion of each object. A configuration comparison processor compares object data from first and second frames to determine differences between first frame video objects and second frame video objects. The configuration comparison processor has a shot boundary detection mode in which it cooperates with a shot boundary detector to identify shot boundaries within a video sequence. In a key frame selection mode, the configuration comparison processor cooperates with a key frame selector to select key frames from the video sequence. A key instance selector communicates with the configuration comparison processor during a key instance selection mode to select key instances of video objects based on differences between first and second instances of video objects. The configuration comparison processor cooperates with a camera operation detector to identify camera operations such as zoom, tracking, and panning within the video sequence. A special effects detector cooperates with the configuration comparison processor to detect special effects video edits such as wipe, dissolve, and fade. The configuration comparison processor and a query match detector enable a user to configure object-based queries and to retrieve video sequences or video frames which include a query video object.

13 Claims, 13 Drawing Sheets

OTHER PUBLICATIONS

"MPEG and Multimedia Communication," Leonardo Chiariglione, IEEE Transaction on Circuit and Systems for Video Technology, vol. 7, No. 1, Feb. 1997, pp. 5–18.*

P. Erhan Eren et al., "Object–Based Video Manipulation and Composition Using 2D Meshes in VRML," *IEEE Signal Processing Society 1997 Workshop on Multimedia Signal Processing*, Jun. 23–25, 1997, Electronic Proceedings, pp. 1–4.

* cited by examiner

OBJECT-BASED PARSING AND INDEXING OF COMPRESSED VIDEO STREAMS

TECHNICAL FIELD

The present invention relates generally to processing digital video information and, more specifically, to parsing and indexing compressed video streams.

DESCRIPTION OF THE RELATED ART

Digitized video provides significant improvements over analog video media with regard to video image manipulation. Digital video data can be readily compressed and decompressed, thereby enabling efficient transmission between remote sites. Efficient compression and decompression also enhance performance in the storage and retrieval of video data. As computer networks improve and video libraries become more accessible to homes and offices via the Internet, the importance of sufficient bandwidth to support video transmission and efficient methods for video indexing, retrieval, and browsing becomes more acute. However, the effective utilization of video resources is hampered by sometimes inadequate organization of video information and a need for further improvements in the performance of retrieval systems for video information.

The time dependent nature of video makes it a uniquely challenging media to, process. Several compression standards have been developed and implemented within the last two decades for video compression, including MPEG-1 and MPEG-2. Numerous techniques for video indexing and retrieval have been developed within the parameters defined by MPEG-1 and MPEG-2. U.S. Pat. No. 5,719,643 to Nakajima describes a method for detecting scene cuts in which an input image and a reference image are entered into an image processing unit and both are converted to contracted images. The contracted input image is compared to the contracted reference image to determine an interframe difference in luminance signals of the input and reference frames and temporal changes between the input and reference frames. Based on the comparison, a determination is made as to whether the input frame is a cut frame, a non-cut frame, or a cut-frame candidate.

It is also known in the art to select key frames from video sequences in order to use the selected frames as representative frames to convey the content of the video sequences from which they are chosen. The key frames are extracted from the video sequences in a manner which is similar to the determination of scene cuts, otherwise known as shot boundaries. A reference frame is compared to an input frame to determine whether the two frames are sufficiently different that a preselected difference threshold has been exceeded. Key frames can be used to enable users of retrieval systems to efficiently browse an entire video sequence by viewing only key frames. Key frames can also be utilized in video retrieval so that only key frames of a video sequence will be searched instead of searching all frames within a video sequence.

The current methods for detecting shot boundaries, extracting key frames, and video retrieval all rely on dissimilarities or similarities between video frames. However, reliance on global descriptions of video frames does not always provide the desired precision in video indexing and retrieval. For example, users of a video retrieval system might have particular subject matter within a video frame which they desire to retrieve without knowledge of any background information which might accompany the subject matter in any particular shot. Utilizing the current video retrieval methods, which rely on global descriptions of video frames, users might well be unable to locate a video shot containing the desired subject matter.

What is needed is a method and system which enables efficient indexing, retrieval, and browsing of compressed video at a higher level of detail than is available in the current art.

SUMMARY OF THE INVENTION

A method for parsing, indexing and retrieving compressed video data includes indexing video frames within a compressed video stream based on a comparison of video objects within frames of the compressed video stream. A first configuration of video objects in a first video frame and a second configuration of video objects in a second video frame are identified, wherein each first frame video object and each second frame video object has an associated quantitative attribute. A comparison of a first quantitative attribute associated with a first frame video object to a second quantitative attribute associated with a second frame video object is performed to ascertain whether a difference between the first and second quantitative attributes exceeds a predetermined threshold. If the predetermined threshold is exceeded, a video frame is selected from a sequence of video frames bounded by the first and second video frames, and the selected frame is used for indexing purposes.

In a preferred embodiment, the method is performed to identify shot boundaries and key instances of video objects, extract key video frames, detect camera operations, detect special effects video editing, and to enable video retrieval and browsing.

The quantitative attributes of video objects relate to at least one of size, shape, motion, or texture. Shot boundaries are detected within a video sequence by selecting the first video frame, which might be an initial video frame in a sequence, and the second video frame such that the first video frame is separated by some predetermined number of video frames from the second video frame. First quantitative attributes associated with the first frame video objects are calculated and compared to second quantitative attributes associated with second frame video objects to determine a quantitative attribute differential between the first and second frames. Alternatively, a quantity of first frame video objects is calculated and compared to a quantity of second frame video objects to determine a video object quantity differential between the first and second video frames. In a first embodiment, the quantitative attribute differential is compared to a shot boundary threshold. If the quantitative attribute differential exceeds the shot boundary threshold, a shot boundary is indexed in the video sequence bounded by first and second video frames. In a second embodiment, the video object quantity differential is compared to a shot boundary threshold to determine if it exceeds the shot boundary threshold to determine if the threshold is exceeded and, if the threshold is exceeded, a shot boundary is indexed. This process is repeated by selecting subsequent first video frames and subsequent second video frames for shot boundary analysis to identify additional shot boundaries in the video sequence.

Within the video shots defined by the shot boundaries, key instances of objects, key frames, camera operations, and special effects video edits are identified. Key instances of video objects are selected within the shot boundaries by calculating first quantitative attributes of a first instance of a video object in a first frame and second quantitative attributes of a second instance of the video object in a second frame and calculating a quantitative attribute differential between the first and second instances of the video object. The quantitative attribute differential is compared to a key instance threshold and, if the differential exceeds the threshold, a key instance of the object is selected from the video sequence bounded by the first and second video frames. The calculation of the quantitative attribute differential captures a wide variety of instance-to-instance transitions which can trigger selections of key instances of video objects. For example, a sequence in which the camera zooms in on the video object rapidly results in a size differential between first and second instances of the video object, which alone is sufficient to exceed the threshold. Alternatively, a combination of changes in quantitative attributes for a video object, such as size and shape, might exceed the threshold, even though none of the quantitative attribute changes in isolation would be sufficient to exceed the threshold.

Key frames are extracted from the various shots of the video sequence defined by shot boundaries by calculating quantitative attributes of first video frame objects and second video frame objects. For each key frame extraction procedure, a quantitative attribute differential is calculated by comparing the first frame quantitative attributes to the second frame quantitative attributes. The quantitative attribute differential is compared to a key frame threshold to determine if a key frame should be selected for the video sequence bounded by the first and second video frames.

To detect camera operations such as zooming, panning, and tracking, motion histograms are calculated for the video objects of selected first and second video frames of the video sequence. The motion histograms identify the direction of motion vectors of each object and the magnitudes of the vectors. A comparison is performed of the motion histograms for the video objects of the selected video frames to ideal motion histograms, each of which represents a different camera operation. Each calculated motion histogram is compared to an ideal zoom histogram, an ideal tracking histogram, and an ideal panning histogram. If the similarity that is calculated for one of the ideal motion histograms exceeds a predetermined threshold, one of the frames of the video sequence is selected for the purpose of indexing a camera operation sequence.

Special effects video editing, such as wipes, fade-in/fade-out, and dissolve, is also calculated using object-based indexing. These special editing effects are not necessarily detected by the shot boundary detection because they are not sharp cuts within the video sequence, but are instead gradual transitions. Special effects edits are detected by comparing first video frame alpha maps to second video frame alpha maps to calculate an alpha map differential which is compared to a special effect video edit threshold. If the threshold is exceeded, an index entry is made to indicate the presence in the sequence of special effects video editing.

Object-based indexing advantageously enables object-based video retrieval. A video query which identifies a query object is received and quantitative attributes are calculated for the object. The query object quantitative attributes are compared to quantitative attributes of video objects within the video sequence to select a query match. In a preferred embodiment, only the key instances of objects within the shots are searched in order to conserve processing resources. Alternatively, all instances of the video objects within each shot can be searched.

A system for object-based video indexing and retrieval includes a configuration detector which ascertains a configuration of video objects in video frames of a video sequence. The configuration includes the quantity of video objects in a frame, the quantitative characteristics of the objects, and their relative orientation. A configuration comparison processor calculates differentials between quantitative attributes of first frame video objects and second frame video objects, differentials for the quantities of objects between first and second video frames, and differentials in the relative orientation of the video objects.

Multiple threshold detection devices are in communication with the configuration comparison processor to detect shot boundaries, key frames, key instances of objects, camera operations, special effects video edits, and query matches. A shot boundary detector detects object quantity differentials which exceed a shot boundary threshold in a first embodiment and quantitative attribute differentials which exceed a shot boundary threshold in a second embodiment. A key frame selector recognizes object orientation differentials which exceed a key frame threshold. A key instance selector detects differences between quantitative attributes of first instances of video objects and quantitative attributes of second instances of the video objects which exceed a key instance threshold. A camera operation detector is configured to detect similarities between calculated motion histograms of video frames and ideal motion histograms which are in excess of a similarity threshold. A special effects detector is configured to detect differentials between alpha maps which exceed a special effect video edit threshold. Finally, a query match detector detects similarities between quantitative attributes of query objects and quantitative attributes of video objects which exceed a query threshold. An indexing device is responsive to the various threshold detection devices to make an index entry in response to the detection of exceeded thresholds.

An advantage provided by the present invention resides in the ability to refine indexing of video sequences to the level of video objects as opposed to entire video frames. A further advantage of the present invention is that video retrieval can be focused more precisely by allowing object-based searching of video sequences in contrast to prior frame-based searching.

DETAILED DESCRIPTION

Figure 1:
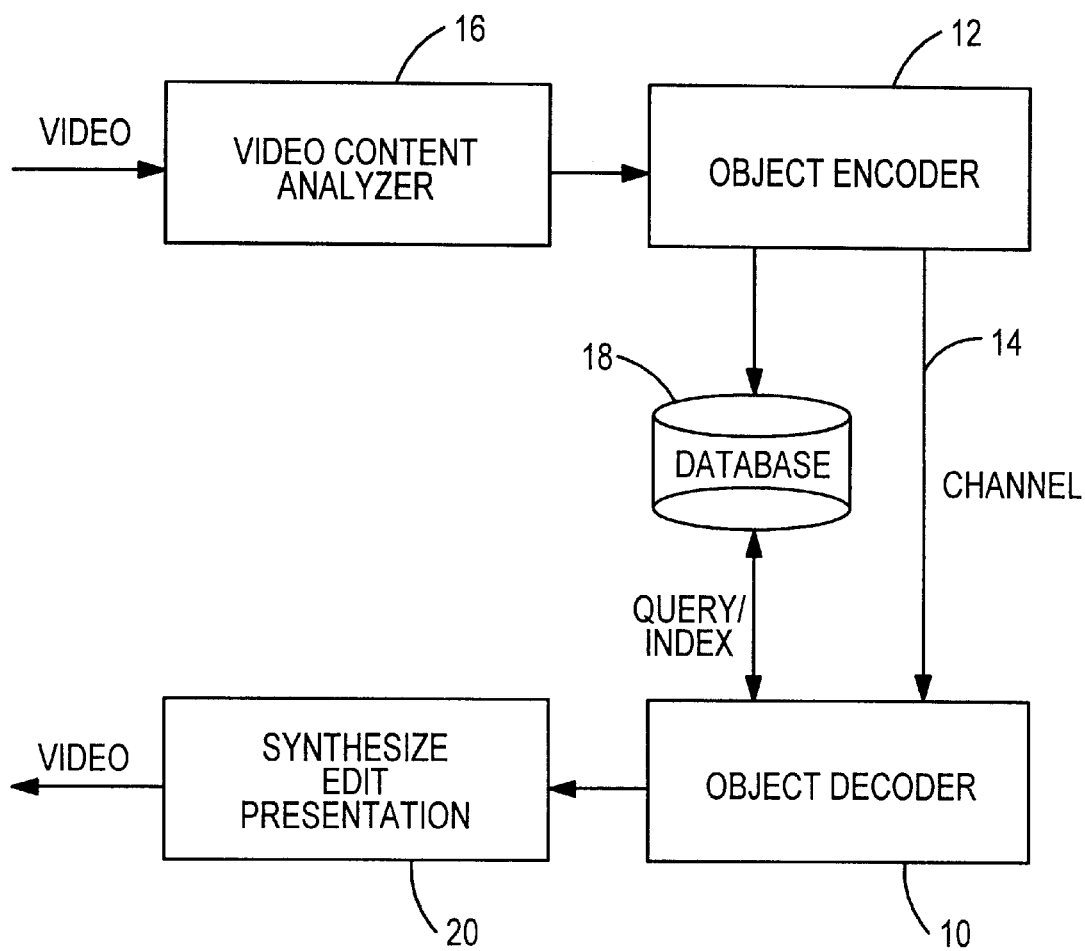
FIG. 1 is a block diagram of a content-based video compression and retrieval system according to the present invention.

With reference to FIG. 1, an object-based video indexing and retrieval system includes a video content analyzer 16 which processes video data prior to data transmission. For a given video sequence, the content analyzer determines the number of video objects within each video frame, their special relationship to each other within the video frames, and objectively quantifiable attributes associated with the video objects. The quantitative attributes relate to the size, shape, motion, and texture and/or color of the video objects. An object encoder 12 formats the video data and the object information extracted by the content analyzer 16 for transmission as compressed data via channel 14 to a object decoder 10.

The object decoder 10 decodes the compressed video content data. The object decoder is configured to process the decoded video content data to identify shot boundaries, key frames, key instances of objects, camera operations, and special editing effects in video sequences. Upon detecting these events in the video data, the object decoder 10 makes an entry into an index database 18.

The development of the video compression standard MPEG-4 has shifted emphasis in video compression toward object-based compression. Previously, MPEG-1 and MPEG-2 compression standards did not provide significant information regarding video objects in the compression process. Consequently, prior art systems and methods for video indexing and retrieval rely on global information regarding video content of each video frame, rather than focusing on video objects within each video frame to perform indexing and retrieval. Performing object-based video indexing and retrieval according to the present invention advantageously enables more precise indexing and retrieval, so that a user is able to formulate object-based queries to retrieve desired video sequences even if the user is unable to identify the environment associated with the video object in the video frames of the sequence. The object decoder 10 responds to a user formulated object-based query by accessing any video frames within the sequence which are determined to match the parameters of the query. A video processor 20 synthesizes and edits the accessed video data for presentation to the user.

Figure 2:
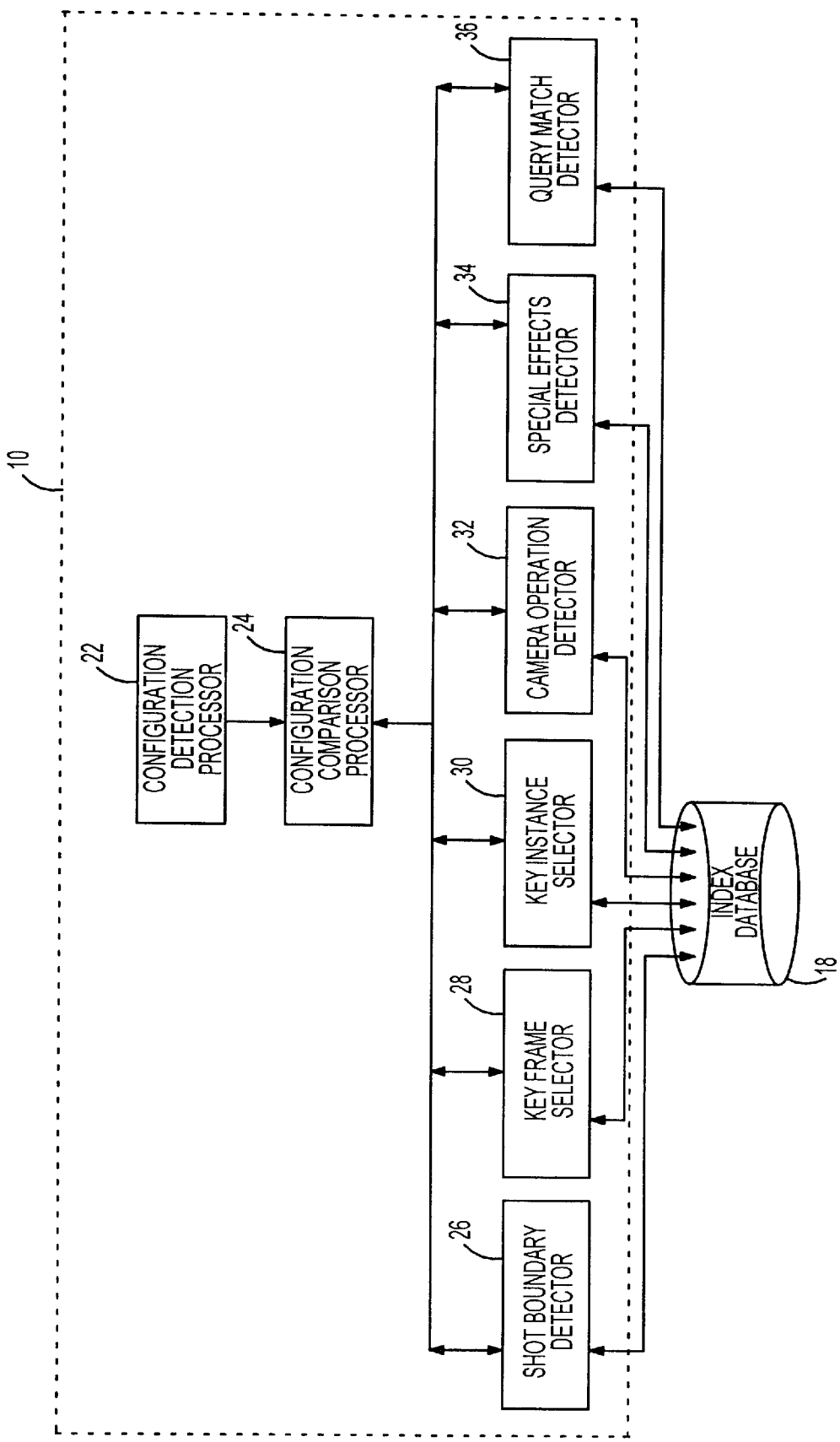
FIG. 2 is a block diagram of functions performed by the object decoder of FIG. 1 in relation to the index database.

With reference to FIG. 2, the object decoder 10 of the objectbased video indexing and retrieval system includes a configuration detection processor 22 which is configured to derive video object data from compressed video data. The video object data includes shape, size, motion, texture, color, and life-cycle data for each video object within a sequence, in addition to the quantity of video objects within each video frame of the sequence. In an MPEG-4 video stream, this video object data is available without the necessity of decompressing the video data. A configuration comparison processor 24 receives the video object data from the configuration detection processor 22 and compares video object data from first video frames to second video frames of the sequence. The configuration comparison processor 24 compares video object data of a first frame, for example the initial frame in the video sequence, to video object data of a second frame which is spaced n frames downstream of the first frame, wherein n represents a whole integer. After performing a first configuration comparison, the configuration comparison processor 24 selects a subsequent first frame which is some predetermined number of frames downstream from the initial frame. The video object data of the subsequent first frame is then compared to the video object data of a subsequent second frame which is n frames downstream of the subsequent first frame. This configuration comparison process continues throughout the video sequence.

Figure 3A:
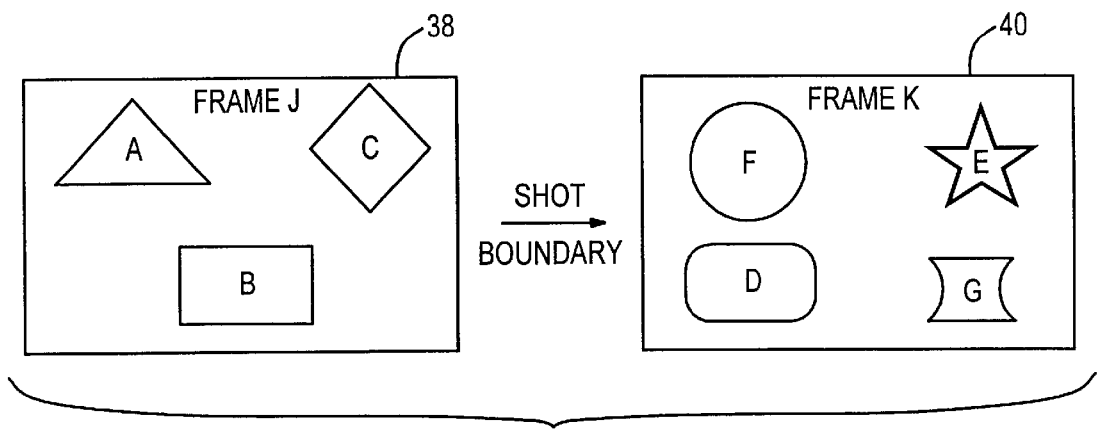
FIG. 3A illustrates exemplary video frames depicting a shot boundary which can be detected by the system illustrated in FIGS. 1 and 2.

The configuration comparison processor 24 has multiple operational modes which include a shot boundary detection mode, a key frame selection mode, a key instance selection mode, a camera operation detection mode, a special effects video editing mode, and a query execution mode. In a first embodiment, during the shot boundary detection operational mode, the configuration comparison processor 24 compares the quantity of first frame video objects to the quantity of second frame video objects. In a second embodiment, the configuration comparison processor 24 compares life cycle data for objects in the first frame to life cycle data for objects in the second frame to determine the identity of first frame video objects as contrasted with the identity of second frame video objects. Alternatively, life cycle data and object quantity data can be utilized in combination by the configuration comparison processor 24 during the shot boundary detection mode. Referring to FIGS. 2 and 3a, an example of a shot boundary detection is illustrated wherein frame J 38 includes video objects A, B, and C and frame K 40 includes video objects D, E, F, and G. The configuration comparison processor 24 determines that frame J 38 includes video objects A, B, and C whereas frame K 40 includes video objects E, D, F, and G by determining that the life cycles of objects A, B, and C had ended and the life cycles of objects D, E, F, and G had begun between frame J 38 and frame K 40. The configuration comparison processor 24 can also be configured to determine that frame J 38 includes three video objects whereas frame K 40 includes four video objects.

With continued reference to FIGS. 2 and 3a, the configuration comparison processor 24 communicates video object life cycle data and/or video object quantity differential data for frame J and frame K to a shot boundary detector 26. The shot boundary detector 26 compares the quantitative attribute differential data and/or the video object quantity differential data to a shot boundary threshold to determine whether a shot boundary exists between frames J and K. If the shot boundary threshold is exceeded, the shot boundary detector 26 makes an entry into the index database 18 indicating the location of the shot boundary.

Figure 3B:
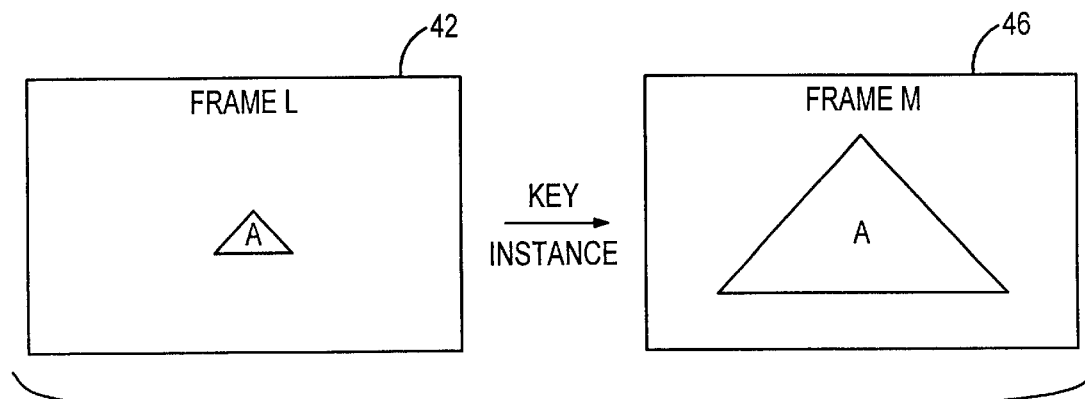
FIG. 3B illustrates exemplary video frames depicting a key instance of a video object which can be detected by the system illustrated in FIGS. 1 and 2.
Figure 3C:
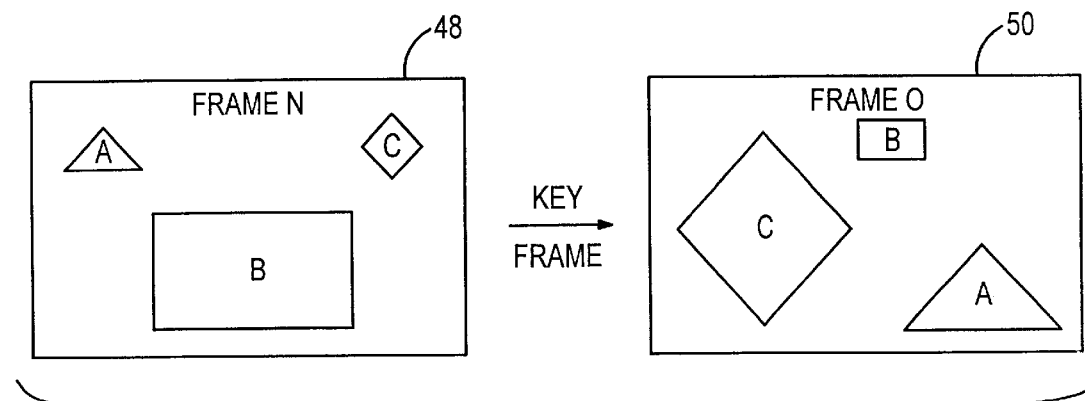
FIG. 3C illustrates exemplary video frames depicting a key frame which can be detected by the system illustrated in FIGS. 1 and 2.

With reference to FIGS. 2 and 3C, within shots detected by the shot boundary detector 26 and the configuration comparison processor 24, it is desirable to select key frames which represent pivotal scenes in shots of the video sequence. The key frames enable a user to rapidly browse a video sequence without having to view every frame of the sequence. The configuration detection processor 22 extracts video object data, which includes size, shape, texture, motion, quantity, relative orientation of video objects for frame N 48 and frame O 50. The configuration comparison processor 24 processes the frame N and frame O object orientation data to produce an object orientation differential for frames N and O. The object orientation differential for frames N and O reflects the changed orientation of the objects in frames N and O. A key frame selector 28 compares the object orientation differential to a key frame threshold to determine if a key frame will be selected from the video sequence bounded by frames N and O. Alternatively, changes in video object quantity or changes in object size, shape, texture, color, or motion can be used to select key frames.

In order to enable users to perform object-based video retrieval and browsing, the configuration comparison processor 24 cooperates with key instance selector 30 to select key instances of video objects within video sequences. The first instance of a video object in a shot is preferably selected as a key instance of the object. The quantitative attributes of subsequent instances of the object in downstream video frames are compared by the configuration comparison processor 24 to the quantitative attributes of the first instance of the object. In a preferred embodiment, the configuration comparison processor 24 utilizes an affiance motion model in comparing motion quantitative attributes of the first instance of the object to motion quantitative attributes of subsequent instances of the object. The affiance motion model takes into account rotation, skew, translation, and zoom types of motion of video objects. During the key instance selection operational mode, the configuration comparison processor 24 extracts the quantitative attributes of a first instance of a video object and a second instance of the video object from a compressed video stream. The configuration comparison processor 24 calculates a differential for the first instance and second instance quantitative attributes.

With reference to FIGS. 2 and 3B, L 42 and M 46 illustrate an example of two frames within a video sequence which might trigger selection of a key instance of an object. Between frames L and M, the camera has zoomed in on object A and the motion quantitative attribute comparison for the second instance of object A and the first instance of object A reveals a zoom-type motion of object A between frames L 42 and M 46. The configuration comparison processor 24 provides the calculated quantitative attribute differential for object A in frames L 42 and M 46 to the key instance selector 30. In addition to zoom-type motion, quantitative attribute differentials of first and second instances of video objects can reveal rotation, skew, and translation of the video objects. The key instance selector determines whether the quantitative attribute differential exceeds a key instance threshold. If the key instance threshold is exceeded, the key instance selector 30 selects a video frame which includes the key instance of object A from the sequence which is bounded by frames L 42 and M 46. The selected frame is then indexed in the index database 18.

Figure 4A:
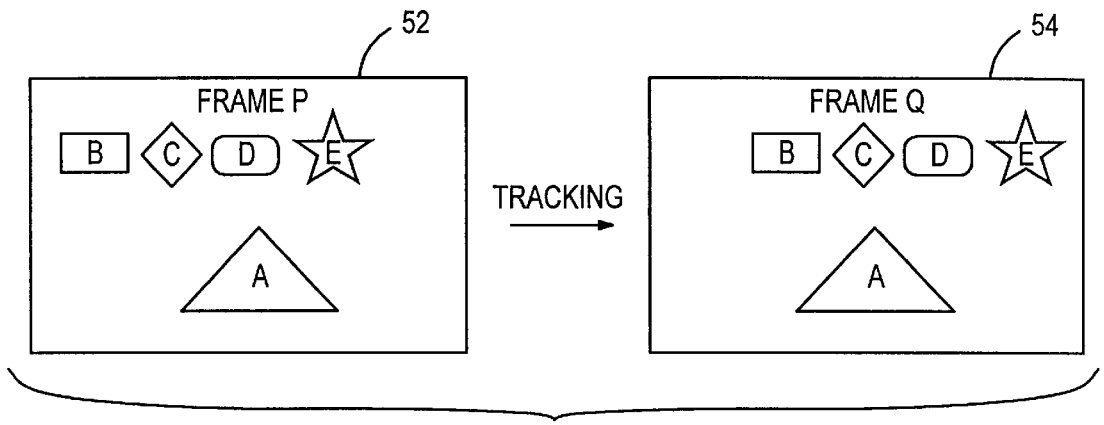
FIG. 4A illustrates exemplary video frames depicting a tracking camera operation which is detectable by the system illustrated in FIGS. 1 and 2.
Figure 4B:
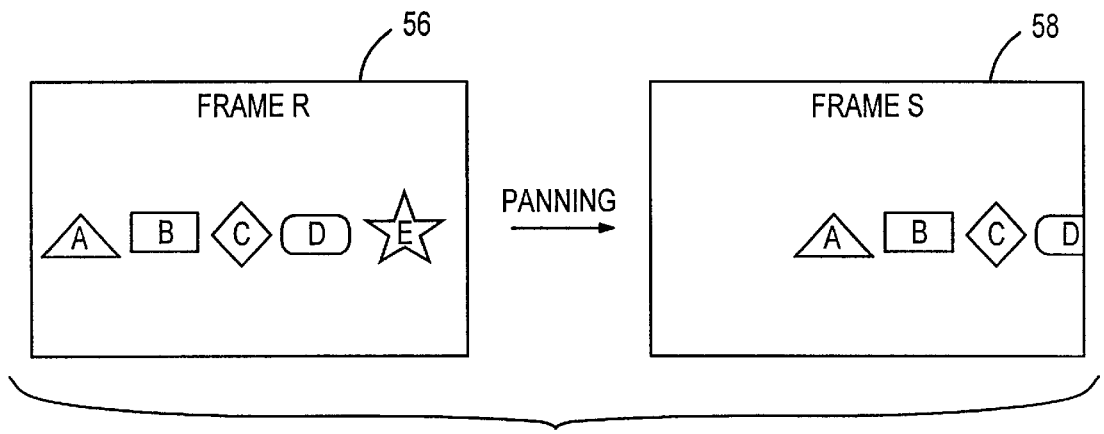
FIG. 4B illustrates exemplary video frames depicting a panning camera operation which is detectable by the system illustrated in FIGS. 1 and 2.

During the camera operation detection operational mode, the configuration comparison processor 24 cooperates with a camera operation detector 32 to identify video sequences which include camera operations such as tracking, panning, and zoom. With reference to FIGS. 2, 3B and 4, the configuration detection processor 22 calculates motion histograms for first and second video frames based on relative motion of first and second frame video objects. Frames L 42 and M 46 of FIG. 3B, illustrate an exemplary zoom sequence. In FIG. 4a, frames P 52 and Q 54 illustrate a tracking sequence and in FIG. 4B frames R 56 and S 58 illustrate a panning sequence. The motion histograms are compared to ideal motion histograms for tracking, panning, and zoom to calculate similarities between the calculated motion histogram and each of the ideal histograms. The configuration detection processor 22 provides the calculated similarity to the camera operation detector 32, which compares each of the calculated similarities to corresponding similarity thresholds. For example, the motion histogram for frames L 42 and M 46 reflects that object A increases in size between frames L and M. The configuration comparison processor 24 compares the motion histogram to each of the ideal motion histograms to obtain corresponding measures of similarity. The camera operation detector 32 compares the similarity measures to corresponding similarity thresholds to reveal that the similarity measure associated with the ideal histogram for zoom is exceeded.

Figure 5:
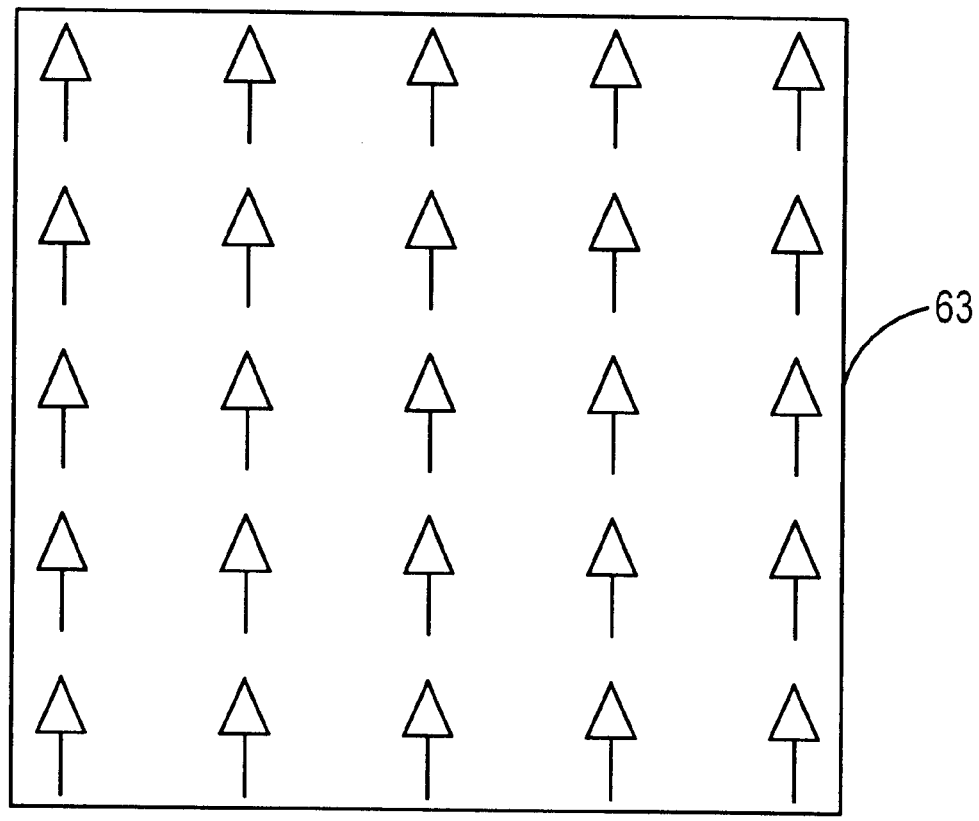
FIG. 5 shows a schematic representation of object motion vectors for a frame in a panning sequence.
Figure 6:
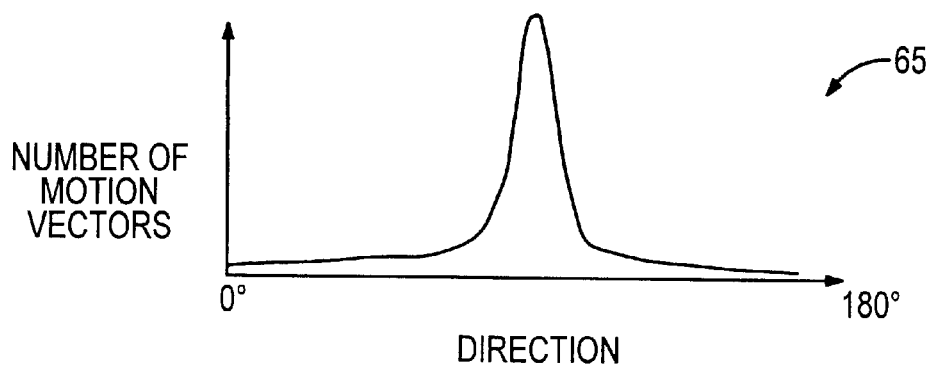
FIG. 6 is a graph of a motion vector distribution for the objects in the video frame illustrated in FIG. 5.
Figure 7:
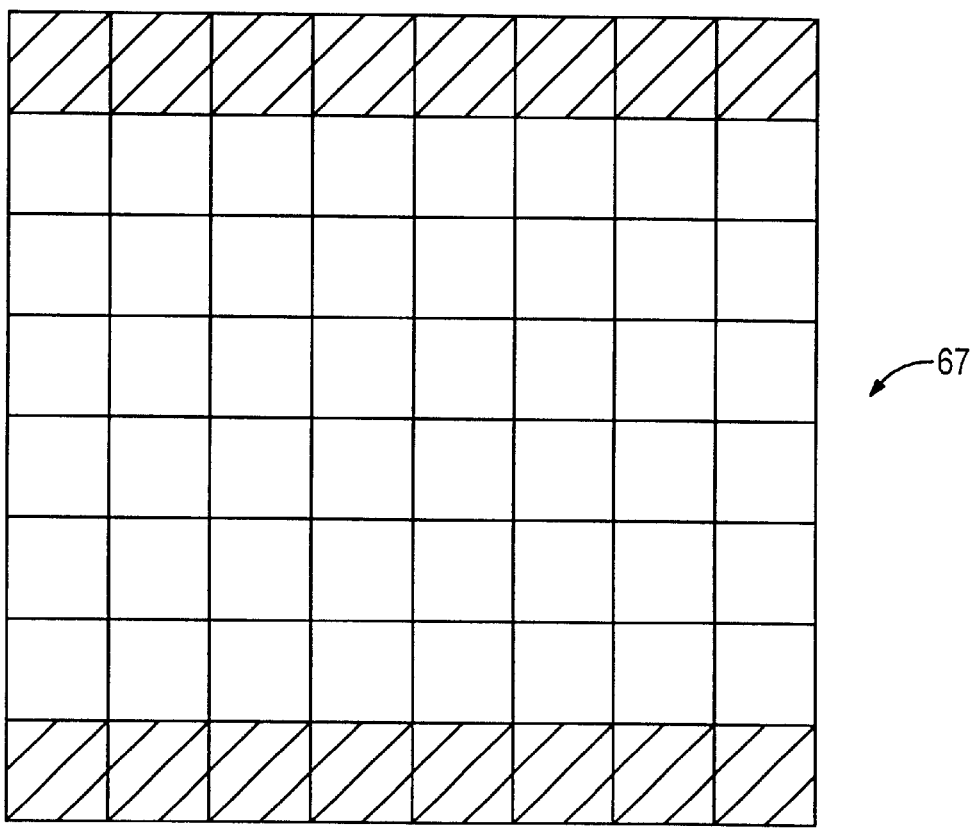
FIG. 7 is a macroblock mode pattern for the video frame illustrated in FIG. 5.

Referring to FIGS. 5, 6, and 7, a schematic representation of a video frame 63 shows the parallel motion vector pattern associated with frames within a panning sequence. A graph 65 of the number of motion vectors versus the angle that the motion vectors make with the horizontal axis shows a spike at 90 degrees which reflects that almost all objects in frame 63 have motion vectors directed at approximately 90 degrees from horizontal. Each camera operation, including zoom and tracking, has a characteristic motion vector distribution associated with it. A schematic representation of macroblock modes 67 for frame 63 shows a pattern which is associated with frames within a panning sequence. The macroblock modes at the upper and lower borders of the frame 63 are likely to differ from the macroblock modes of the rest of the macroblocks in the frame, because of occlusion of subject matter as the camera pans. In a preferred embodiment, the motion vector distribution for video objects and the macroblock mode pattern are utilized to verify detection of camera operations such as zoom, panning, and tracking. Furthermore, to detect a zoom sequence, the difference in size of a first instance of an object and a second instance of the object is indicative of a zoom if the size difference exceeds a threshold.

Figure 4C:
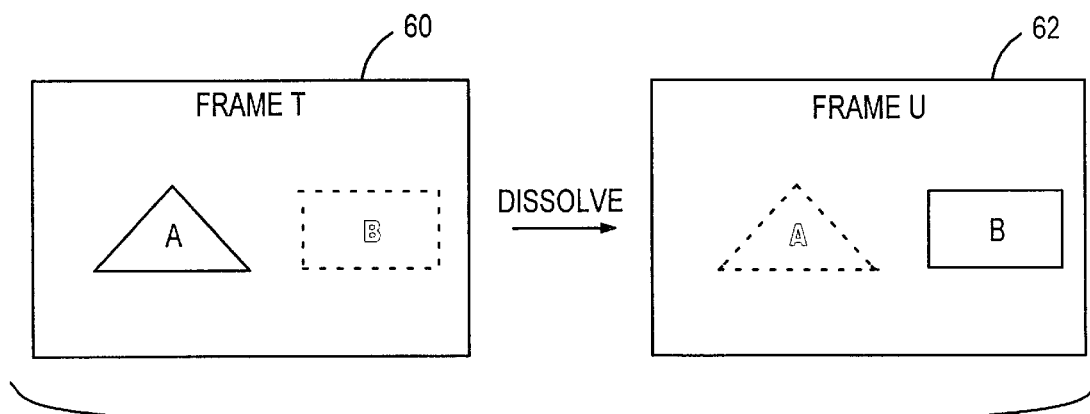
FIG. 4C illustrates exemplary video frames depicting a dissolve camera operation with is detectable by the system illustrated in FIGS. 1 and 2.

In addition to detecting sharp cuts within video sequences, it is also desirable to detect gradual transitions within video sequences, such as fade-in and fade-out, wipe, and dissolve. In FIG. 4C, frames T 60 and U 62 illustrate an example of a dissolve special effect video edit in which video object B is emerging in frame T 60 and object A is fading in frame U 62. The configuration detection processor 22 derives alpha maps for objects A and B in frame T 60 and alpha maps of objects A and B for frame U 62. The configuration comparison processor 24 compares the alpha maps for frame T to the alpha maps for frame U to calculate alpha map differentials. For example, an alpha map value for a pixel within object A in frame T 60 will have a higher object intensity than the alpha map value for the corresponding pixel in frame U 62. Similarly, an alpha map value for a pixel within object A will have a lower object intensity in frame T 60 than the alpha map value for the corresponding pixel in frame U 62. If objects A and B were superimposed in frames T 60 and U 62, a pixel would have a decreasing object intensity for the alpha map for object A between the two frames whereas the same pixel would have an increasing object intensity for the alpha map for object B between the two frames. The special editing effects detector receives the alpha map differential data and compares it to a special effect video edit threshold. The special effects video edit threshold enables detection of gradual transitions, such as dissolves, which might escape detection by the shot boundary detector 26 and the key frame selector 28.

Figure 8:
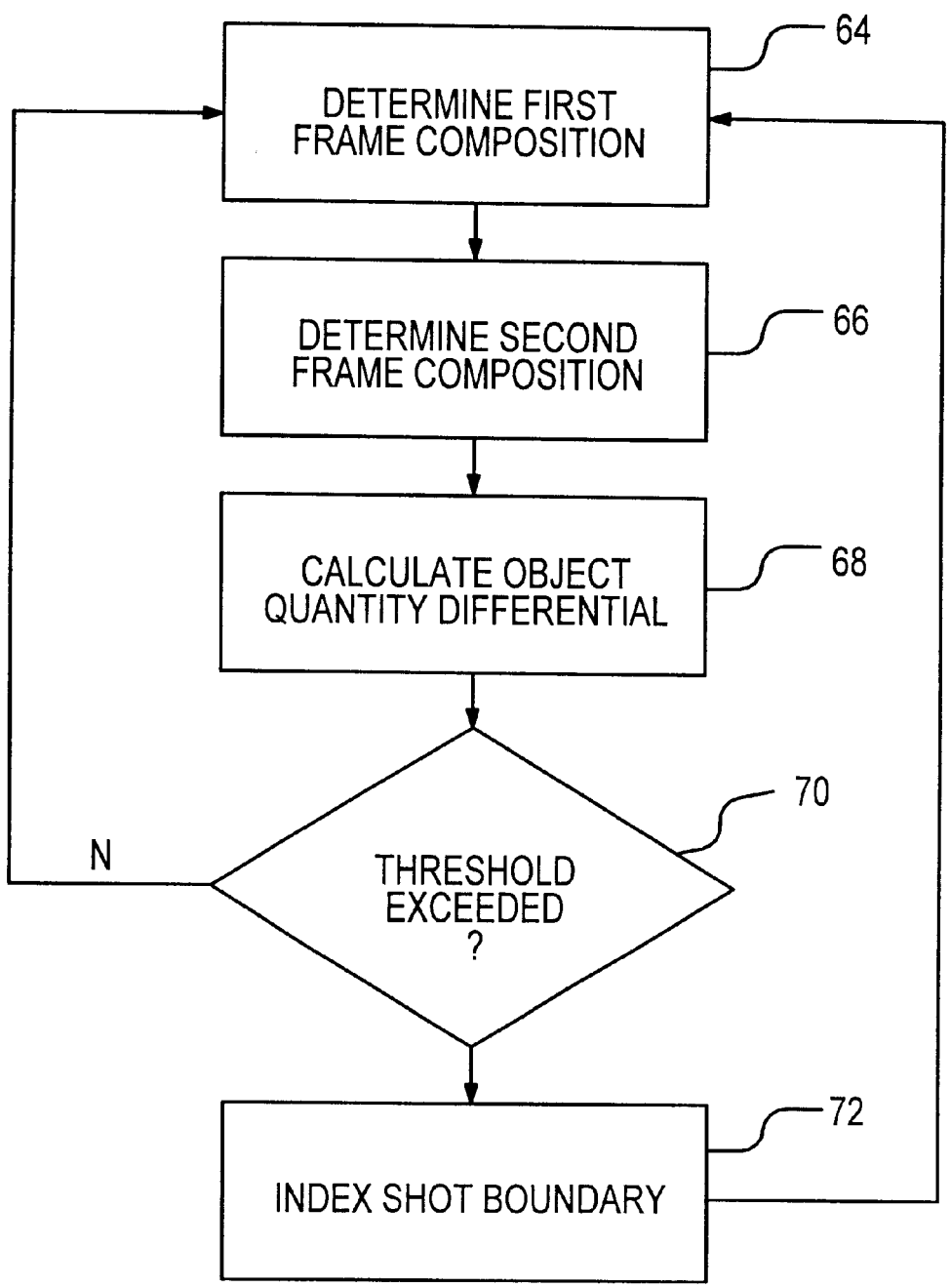
FIG. 8 is a process flow of steps for a shot boundary detection method performed by the system of FIGS. 1 and 2.

Referring to FIGS. 2 and 8, a method for object-based detection of shot boundaries of a video sequence in a compressed video stream includes the step 64 of determining a composition of video objects in a first video frame. The configuration detection processor 22 calculates the quantity of video objects in the first frame. In an alternative embodiment, the configuration detection processor 22 determines the identity of first frame video objects based on life cycle data associated with each first frame video object. In step 68, the configuration detection processor determines the quantity of video objects in a second video frame in the video sequence or, in the alternative embodiment, the identity of the second frame video objects. The configuration detection processor 22 provides the configuration comparison processor 24 with the first and second frame object data and, in steps 72 and 74, the configuration comparison processor calculates an object composition differential or an object quantity differential for the first and second frames. The object quantity differential is communicated to the shot boundary detector 26 and, in step 76, the shot boundary detector determines if the object quantity differential for the first and second frames exceeds a shot boundary threshold. Alternatively, object composition differential is compared to the shot boundary threshold to determine if the shot boundary threshold is exceeded. If the threshold is exceeded, in step 78 the shot boundary is indexed in the index database 18 and the shot boundary detection is performed on subsequent first and second video frames which are both downstream of the first detected shot boundary. If no shot boundary is detected, the shot boundary detection procedure is repeated without performing the indexing step.

Figure 9:
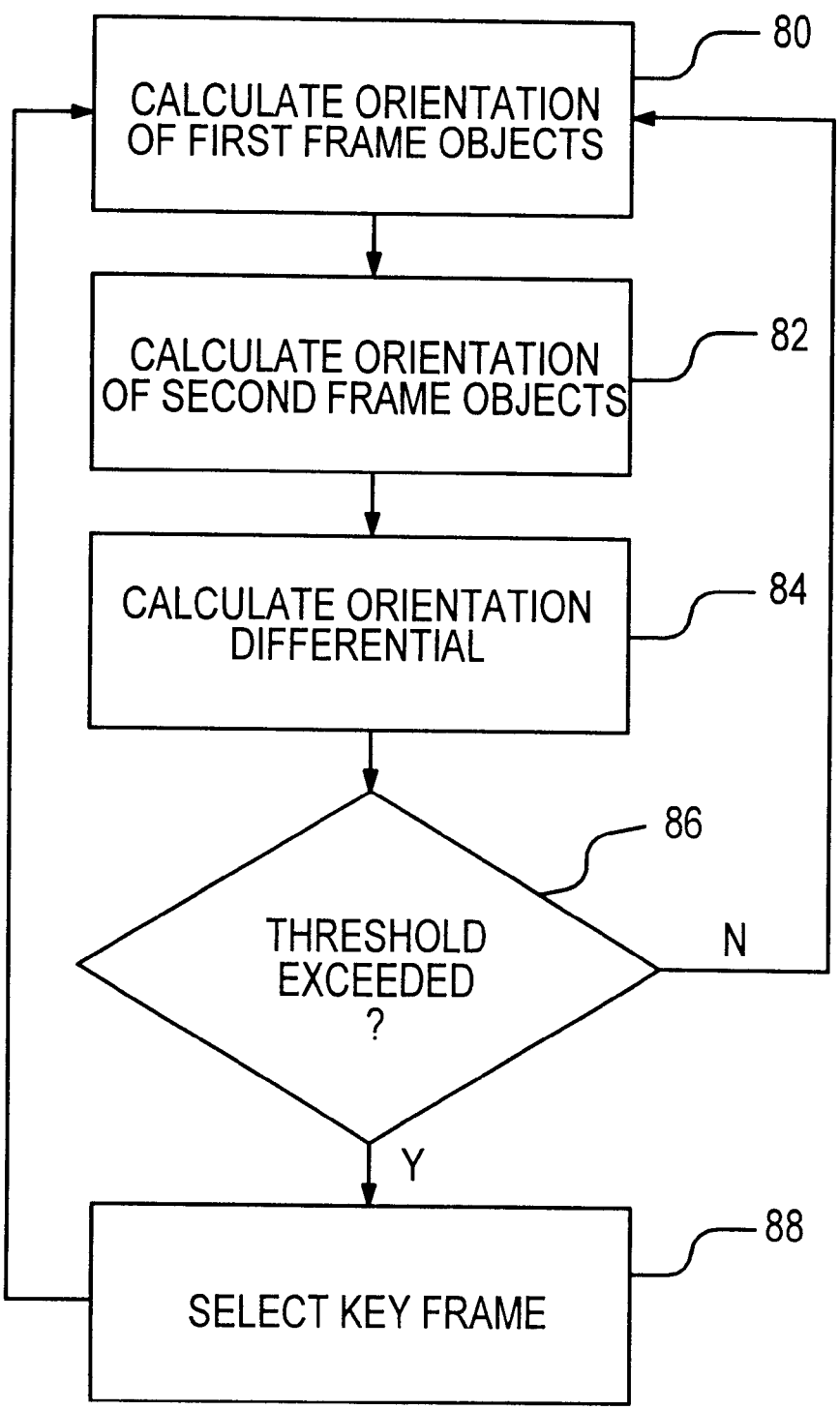
FIG. 9 is a process flow of steps for a key frame selection method performed by the system of FIGS. 1 and 2.

Referring to FIGS. 2 and 9, a method for selecting a key frame from the video sequence includes the steps 80 and 82 of determining the orientation of video objects for first and second video frames. The configuration detection processor 22 calculates an object orientation differential for the first and second video frames in step 84 and the key frame selector 28 compares the object orientation differential to a key frame threshold to determine in step 86 if a key frame will be selected from the sequence bounded by the first and second video frames. Alternatively, the configuration comparison processor 24 can calculate differentials for quantity, color, texture, motion, shape and/or size for first and second frame video objects which the key frame selector 28 utilizes in selecting key frames. If the key frame threshold is not exceeded, subsequent first and second frames are selected and the process is repeated. If the key frame threshold is exceeded, a video frame is selected in step 88 and the video frame is indexed in the index database 18 prior to selection of the subsequent first and second video frames for a subsequent key frame selection process.

Figure 10:
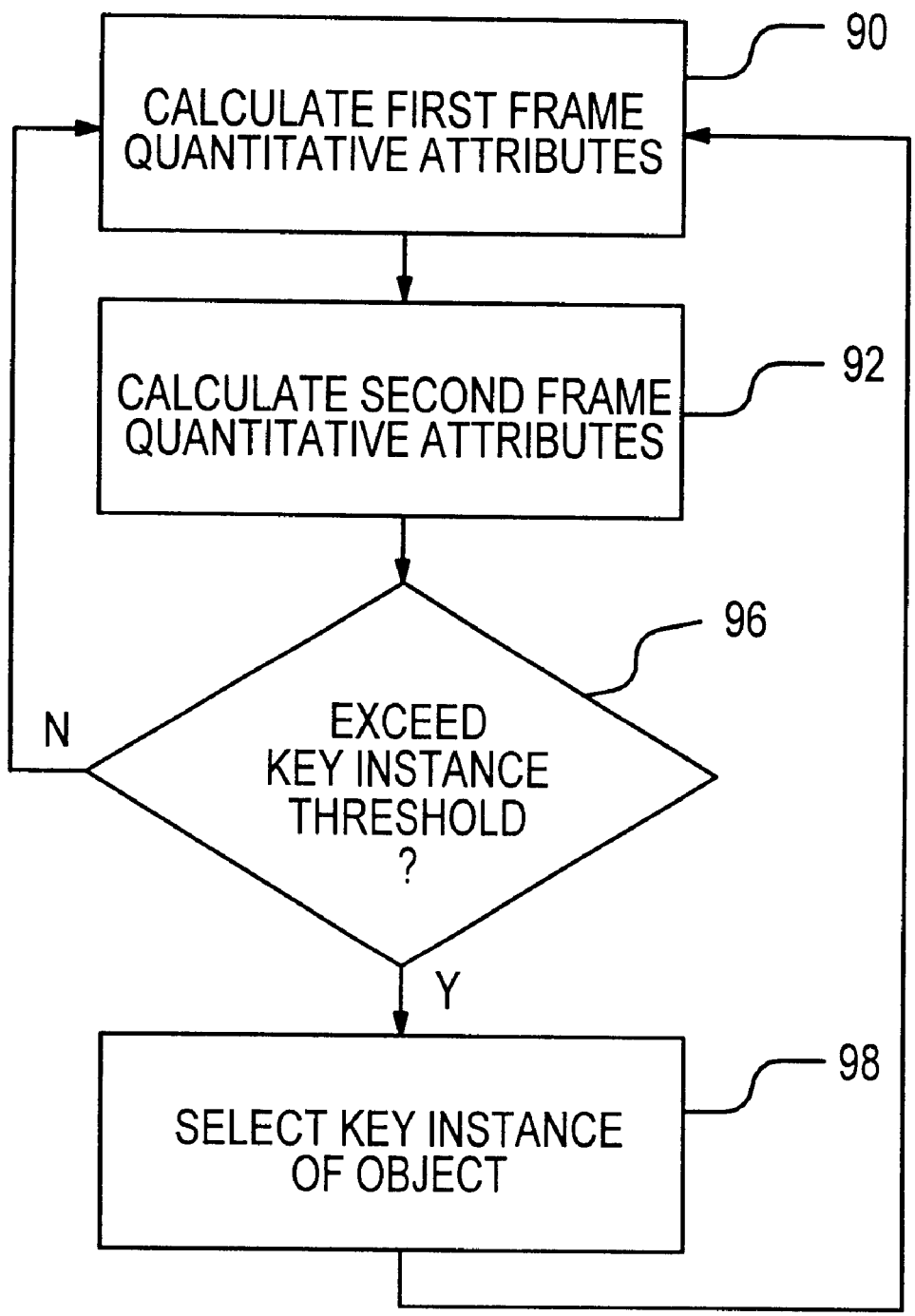
FIG. 10 is a process flow of a method for selecting key instances of objects performed by the system of FIGS. 1 and 2.

Referring to FIG. 10, in order to select a key instance of a video object, in step 90 the configuration detection processor 22 derives first quantitative attributes associated with a first instance of video object in a first video frame of a compressed video stream such as an MPEG-4 video stream. In step 92, the configuration detection processor 22 obtains second quantitative attributes associated with a second instance of the video object in a second video frame of the compressed video stream. The configuration comparison processor 24 compares the first quantitative attributes to the second quantitative attributes to calculate a quantitative attribute differential and, in step 96, the key instance selector 30 determines whether the quantitative attribute differential exceeds a key instance threshold. If the key instance threshold is not exceeded, subsequent first and second video frames are selected and the key instance selection process is repeated for the remainder of the video sequence. If the key instance threshold is exceeded, a video frame which includes a key instance of the video object is selected from the frames bounded by the first and second video frames in step 98 prior to repeating the key instance selection process on subsequent first and second video frames.

Figure 11:
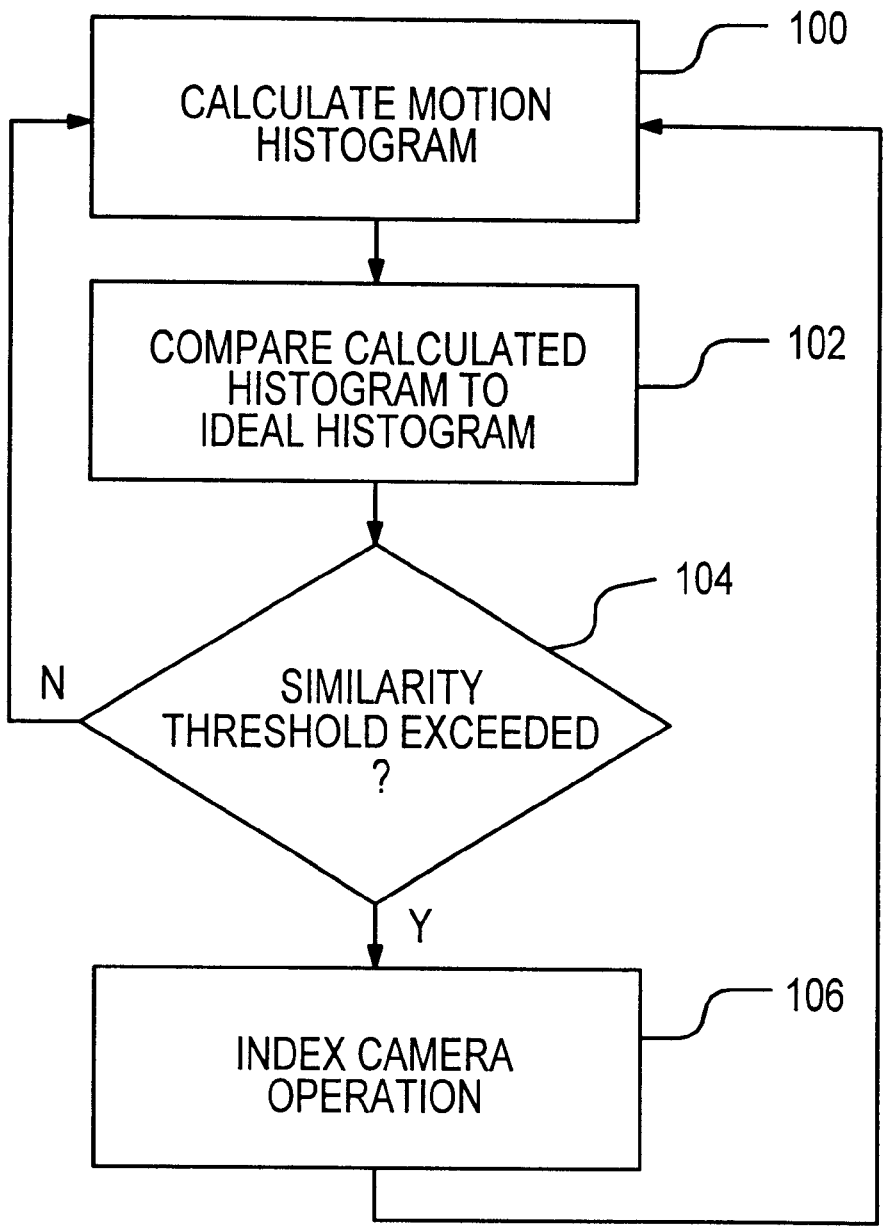
FIG. 11 is a process flow of a method for detecting camera operations such as tracking, panning, and zooming performed by the system of FIGS. 1 and 2.

With reference to FIGS. 2 and 11, a method for identifying camera operations such as zooming, panning, and tracking includes the step 100 of utilizing the configuration detection processor 22 to calculate a motion histogram to ascertain motion vectors of a set of video objects within a video sequence bounded by first and second video frames. The index database 18 stores ideal motion histograms for zooming, tracking, and panning. In step 102 the configuration comparison processor 24 compares the calculated motion histogram to the ideal motion histograms to obtain a similarity value corresponding to the calculated motion histogram for each ideal motion histogram.

In step 104 the camera operation detector 32 compares each similarity value to a corresponding similarity threshold to determine if any of the thresholds have been exceeded. For example, the similarity value associated with the zoom ideal motion histogram is compared to the zoom similarity threshold and the similarity value associated with the panning ideal motion histogram is compared to the panning similarity threshold. If no similarity threshold is exceeded, a subsequent motion histogram is calculated for another video sequence bounded by subsequent first and second frames and the camera operation detection process is repeated. If the similarity thresholds is exceeded, key frames are selected which are representative of the camera operation and in step 106 the key frames are indexed in the index database 18. Key frames for a zoom sequence are preferably selected to include the initial frame of the zoom sequence, the middle frame, and the terminal frame. Key frames for tracking and panning sequences preferably are selected to include a 25% overlap in frame composition. In a preferred embodiment, motion vector distributions and macroblock mode patterns for selected frames are utilized to verify the identification of camera operations within a video sequence.

Figure 12:
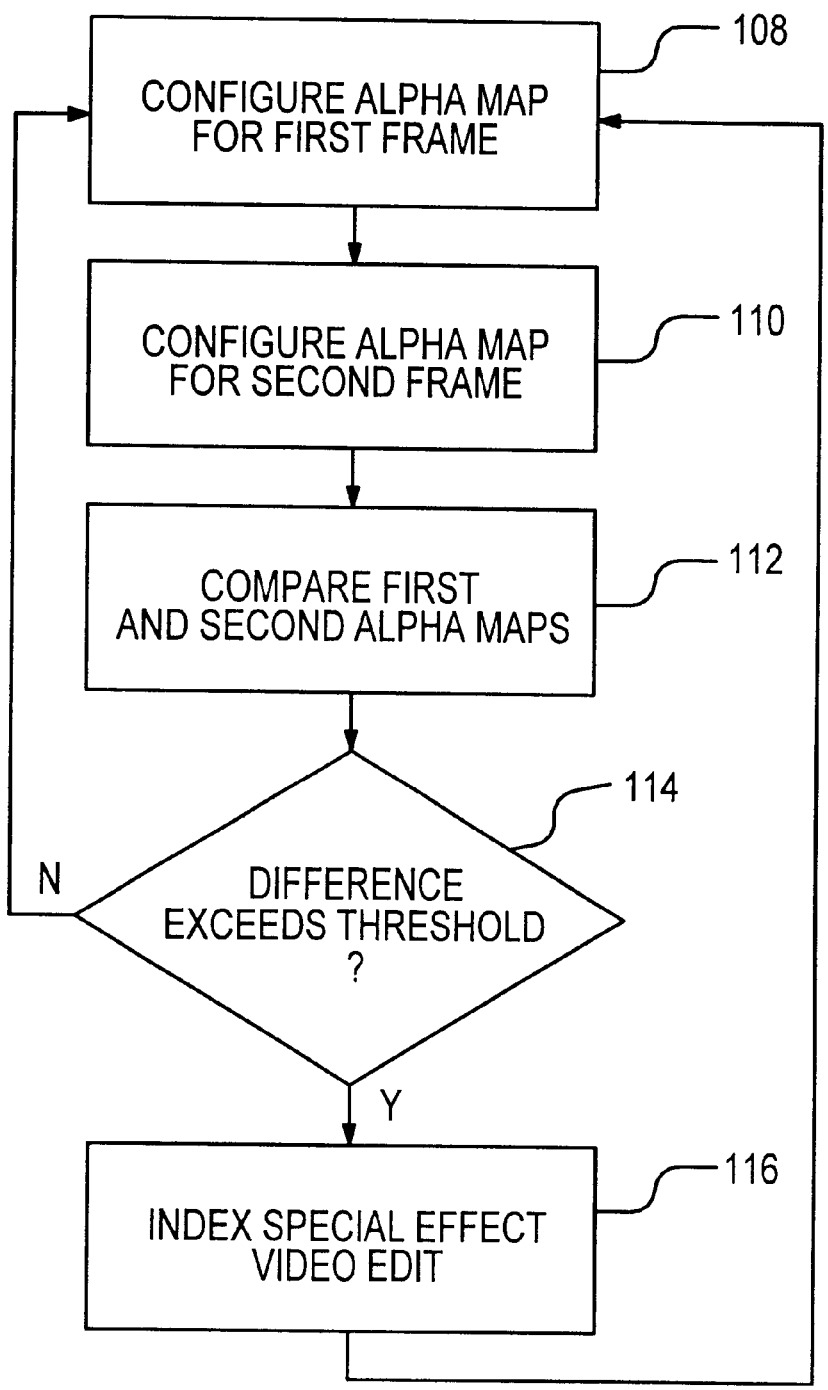
FIG. 12 is a process flow of a method for detecting special effect video edits according to the system of FIGS. 1 and 2.

Referring to FIGS. 2 and 12, an object-based method for detecting special effects video edits such as wipe, fade, and dissolve includes the steps 108 and 110 of configuring first alpha maps for first frame video objects and configuring second alpha maps for second frame video objects. The configuration comparison processor 24 compares the first and second alpha maps to obtain an alpha map differential in step 112 and the special effects detector 34 compares the alpha map differential to a special effects video edit threshold in step 114. The special effects video edit threshold is calibrated to enable detection of gradual transitions associated with wipes, fades, and dissolves which the shot boundary thresholds and key frame selection thresholds might not be able to detect. If the special effects video edit threshold is not exceeded, the special effects video edit detection process is repeated for subsequent first and second video frames. If the threshold is exceeded, an entry is made into the index database in step 116 prior to repeating the process on subsequent first and second video frames.

Figure 13:
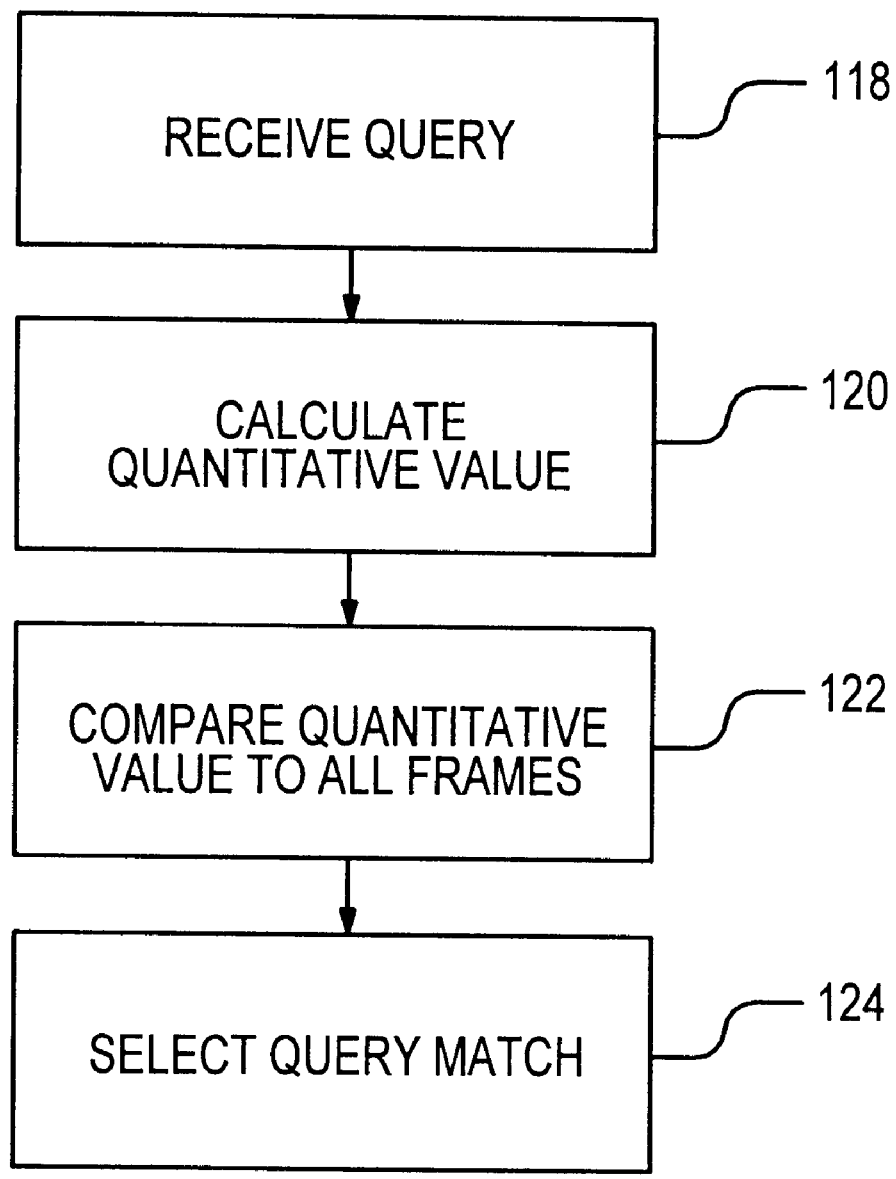
FIG. 13 is a first embodiment of a method for performing objectbased video retrieval according to the system of FIGS. 1 and 2.

Referring to FIGS. 2 and 13, a first embodiment of an object-based video retrieval method includes the step 118 of receiving a user-generated query which includes a video object. In step 120 the quantitative attributes of the query video object are calculated and the configuration comparison processor 24 compares the query object attributes to the quantitative attributes of video objects in all frames of a video sequence in step 122. Alternatively the configuration comparison processor 24 can be configured to compare the query object quantitative attributes only to quantitative attributes of video objects contained in selected key frames of the video sequence or video objects in all frames of the video sequence. In a preferred mode, the query match detector 36 ranks video objects according to a similarity of their quantitative attribute values to the query object quantitative attribute values. A user can use the ranked results to select a match. Alternatively, the query match detector compares similarity values generated by the query object quantitative value comparisons to a query match threshold to determine if any matches exist for the query. In step 124 the query match detector 36 selects frames as query matches which have video objects with associated similarity values in excess of the query match threshold. The selected video frames are indexed as query matches in the index database 18.

Figure 14:
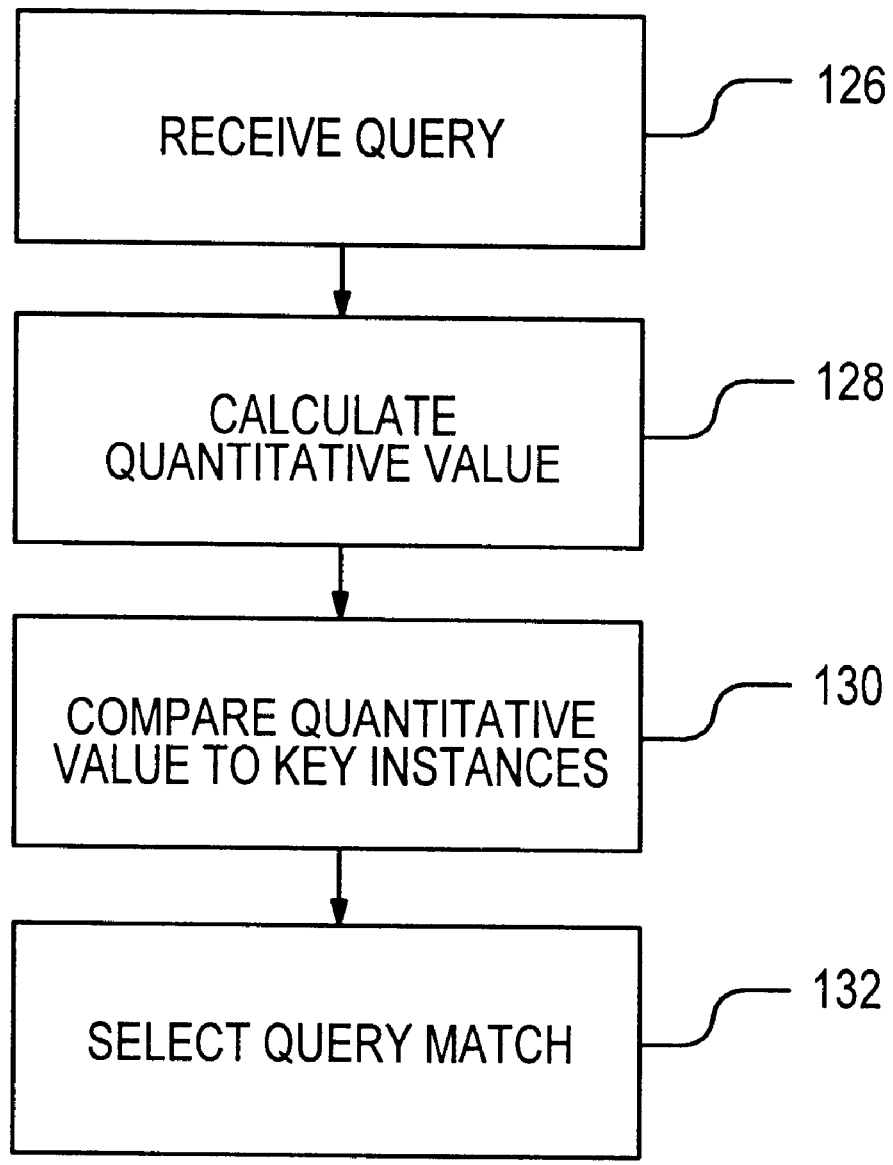
FIG. 14 is a preferred embodiment of a method for performing object-based video retrieval according to the system of FIGS. 1 and 2.

With reference to FIGS. 2 and 14, a preferred embodiment of the object-based video retrieval method includes the steps 126 and 128 of receiving the user-generated query and calculating quantitative attributes for the query object. Instead of comparing the query object quantitative values to quantitative values of video objects in all video frames or key frames, in step 130 the query object quantitative values are compared to quantitative values of key instances of video objects in order to conserve processing resources. Preferably, the comparison results are ranked according to similarity of quantitative attributes of key instances to query object quantitative attributes. In step 132, video frames associated with identified query matches are selected and indexed into the index database 18.

What is claimed is:

1. A method for object-based parsing and indexing compressed video streams comprising the steps of:
    identifying first composition of first frame video objects in a first video frame of a compressed video stream, each said first frame video object in said first composition being a video representation of a physical entity that was imaged during capture of said first video frame, including assigning each of said first frame video objects at least one associated first quantitative attribute value and including determining a first orientation of said first frame video objects;
    identifying a second composition of second frame video objects in a second video frame of said compressed video stream, each said second frame video object in said second composition being a video representation of a physical entity that was imaged during capture of said second video frame, including assigning each second frame video object at least one associated second quantitative attribute value and including determining a second orientation of said second frame video objects;
    comparing at least one first quantitative attribute value to at least one second quantitative attribute value to determine if a predetermined threshold has been exceeded, said predetermined threshold being related to a difference between attribute values, including comparing said first and said second orientations; and
    as a response to said determination of whether said predetermined threshold has been exceeded, selectively indexing a video frame selected from a portion of said compressed video stream bounded by said first video frame and said second video frame.

2. The method of claim 1 wherein said step of assigning said first and second quantitative attribute values includes determining attribute values related to at least one of motion, shape, texture, color, and size of a first instance of a first frame video object in said first video frame and a second instance of said first frame video object in said second frame, said comparing step including determining if a difference between said first and said second quantitative attribute values exceeds a key instance threshold, said indexing step including indexing a key instance of said first video object in response to a determination that said difference between said first and said second quantitative attribute values exceeds said key instance threshold.

3. The method of claim 2 further comprising the steps of:
    receiving an image retrieval query which includes an identification of a query video object having a query quantitative attribute value;
    comparing said query quantitative attribute value to a quantitative attribute value of said indexed key instance to determine if a similarity between said query quantitative value and a related quantitative attribute value of said key instance exceeds a query threshold; and
    selecting said key instance of said first video object as a query match in response to said image retrieval query if said similarity exceeds said query threshold.

4. The method of claim 2 further comprising the steps of:
    receiving an image retrieval query which includes an identification of a query video object having a query quantitative attribute value;
    calculating a similarity value between said query quantitative attribute value and a quantitative attribute value of said indexed key instance; and
    presenting said similarity value in a ranking of similarity values generated by comparing said query quantitative attribute value to quantitative attribute values of other key instances.

5. The method of claim 1 wherein said comparing step includes comparing first quantitative attribute values of first frame video objects to second quantitative attribute values of second frame video objects to determine if a key frame threshold is exceeded, said selective indexing step including selectively indexing a key frame as a response to a determination that said key frame threshold has been exceeded.

6. The method of claim 1 wherein said step of identifying said first composition of said first video frame and said step of identifying said second composition of said second video frame include calculating a motion histogram at least partially based on first quantitative attribute values associated with a first occurrence of a subset of said first frame video objects in said first video frame and second quantitative attribute values associated with a second occurrence of said subset of said first frame video objects in said second video frame, the method further comprising a step of comparing said calculated motion histogram to a predetermined ideal motion histogram to determine if said video sequence which includes said first and said second video frames comprises one of a zoom camera operation, a panning camera operation, and a tracking camera operation.

7. The method of claim 6, wherein said step of calculating said motion histogram occurs after a determination of whether said video sequence bounded by said first video frame and said second video frame includes a shot boundary.

8. The method of claim 1 wherein said step of identifying said first composition of video objects includes assigning said each of said first frame video objects an object intensity, said step of identifying said second composition of video objects including assigning said each second frame video object an object intensity, said comparing step including comparing said object intensities of said first frame video objects to said object intensities of said second frame video objects to determine if a special effects video edit threshold has been exceeded.

9. A method for indexing a video sequence within a compressed video stream and for video retrieval comprising the steps of:
  extracting key instances of video objects within each video shot defined by consecutive shot boundaries, said key instance extraction including the steps of:
    a) identifying a first set of quantitative attributes associated with a first instance of a video object in a first video frame, said first instance of a video object being a video representation of a physical entity that was imaged during capture of said first video frame, said first set of quantitative attributes including at least one of motion, size, shape, color, and texture;
    b) identifying a second set of quantitative attributes associated with a second instance of said video object in a corresponding second video frame, said second instance of a video object being a video representation of a physical entity that was imaged during capture of said second video frame, said second set of quantitative values including at least one of motion, size, shape, color, and texture;
    c) comparing said first set of quantitative attributes to said second set of quantitative attributes to determine if a difference between said first and said second set of quantitative attributes exceeds a key instance threshold; and
    d) indexing a key instance of said video object if said key instance threshold is exceeded;
  establishing said shot boundaries within said video sequence in said compressed video stream, including the steps of:
    a) selecting first video frames and second video frames within said compressed video stream such that each first video frame corresponds to a second video frame, thereby identifying corresponding first and second video frames;
    b) calculating video object quantity differentials between said first video frames and said second video frames;
    c) for each said corresponding first and second video frames, determining if an object quantity differential exceeds a shot boundary threshold; and
    d) indexing a shot boundary within each video subsequence defined by each said corresponding first and second video frames having an object quantity differential which exceeds said shot boundary threshold; and
  extracting key frames within each video shot defined by consecutive shot boundaries, including the steps of:
    a) for each said corresponding first and second video frames within a subset of said corresponding first and second video frames determined not to define a shot boundary, determining if one of a quantitative attribute differential and said object quantity differential exceeds a key frame threshold; and
    b) indexing at least one key frame for each shot having said corresponding first and second video frames determined to have one of an associated quantitative attribute differential and object quantity differential in excess of said key frame threshold.

10. The method of claim 9, further comprising the steps of:
  receiving a video object query which includes associated query object quantitative attributes;
  comparing said query object quantitative attributes to quantitative attributes associated with said indexed key instance of said video object;
  determining whether a similarity between said query object quantitative attributes and said quantitative attributes associated with said particular key instance of said video object exceeds a query threshold; and
  selecting said key instance of said particular video object as a query match if said query object quantitative attributes are determined to have a similarity to said query object quantitative attributes in excess of said query threshold.

11. The method of claim 9, wherein said compressed video stream is an MPEG-4 video stream.

12. A method for object-based parsing and indexing compressed video streams comprising the steps of:
  identifying a first composition of first frame video objects in a first video frame of a compressed video stream, each said first frame video object in said first composition being a video representation of a physical entity that was imaged during capture of said first video frame, including assigning each of said first frame video objects at least one associated first quantitative attribute value and including determining a first orientation of said first frame video objects;
  identifying a second composition of second frame video objects in a second video frame of said compressed video stream, each said second frame video object in said second composition being a video representation of a physical entity that was imaged during capture of said second video frame, including assigning each second frame video object at least one associated second quantitative attribute value;
  comparing at least one first quantitative attribute value to at least one second quantitative attribute value to determine if a predetermined threshold has been exceeded, said predetermined threshold being related to a difference between attribute values; and
  as a response to said determination of whether said predetermined threshold has been exceeded, selectively indexing a video frame selected from a portion of said compressed video stream bounded by said first video frame and said second video frame;
  wherein said step of identifying said first composition of said first video frame and said step of identifying said second composition of said second video frame include calculating a motion histogram at least partially based on first quantitative attribute values associated with a first occurrence of a subset of said first frame video objects in said first video frame and second quantitative attribute values associated with a second occurrence of said subset of said first frame video objects in said second video frame, the method further comprising a step of comparing said calculated motion histogram to a predetermined ideal motion histogram to determine if said video sequence which includes said first and said second video frames comprises one of a zoom camera operation, a panning camera operation, and a tracking camera operation.

13. The method of claim 12 wherein said step of calculating said motion histogram occurs after a determination of whether said video sequence bounded by said first video frame and said second video frame includes a shot boundary.

* * * * *